2,852,404

PROCESS OF MAKING STARCH MOBILE AND HYDROPHOBIC

Robert W. Satterthwaite, Argo, Ill., assignor to Corn Products Refining Company, New York, N. Y., a corporation of New Jersey No Drawing. Application December 1, 1955
Serial No. 550,459

6 Claims. (Cl. 106—211)

This invention relates to the preparation of a mobile, hydrophobic starch.

In various industries there is a need for a mobile, hydrophobic starch. For example, starch has been used in off-set printing to keep the printed sheets from sticking together. The printed sheets are dusted with the starch before being stacked. However, the high humidity of the printing operations may cause certain starches to lose their mobility, thus making them unsatisfactory. Similarly, starches have been used for dusting, e. g., in foundry practice, but they have not been entirely satisfactory where they come into contact with large amounts of moisture.

It is an object of this invention to prepare a highly mobile and hydrophobic starch. A further object is to prepare such starch in a simple and economically feasible manner. Other objects will appear hereinafter.

I have discovered that a mobile, hydrophobic starch may be prepared by heating an aqueous slurry of starch with a water-soluble soap, and thereafter with a water-soluble aluminum salt, the temperature being maintained below the gelatinization temperature of the starch during said treatments, adjusting the pH of the thus treated starch to about 5, filtering, drying, and grinding the resultant product. The soaps which may be used include the stearates, palmitates, oleates and the like. The invention will be described in respect of stearates since they are the preferred soaps. However, palmitates and oleates behave in substantially the same way and it is not the intention to thereby limit the invention.

The stearates which may be used include commercial grades of sodium, ammonium and potassium stearates in granular, powdered or paste emulsion. These can be dissolved in water at 140–150° F. under agitation, the amount being about one part of stearate in 40–50 parts of water. It is preferable to add the stearate slowly to the water while agitating the same. It may be desirable to add a defoaming agent during the agitation to defoam the solution.

The ratio of stearate compound to starch used in the preparation of my mobile, hydrophobic starch may vary widely but 0.005 to 0.04 part per one part of dry starch is the preferable ratio.

The stearate solution should be cooled to a temperature which will not gelatinize the starch before the solution is added to the starch slurry.

It is preferable to add the stearate solution under agitation to the starch slurry and to continue agitation thereafter for 30 to 60 minutes depending upon the type and speed of agitation available in order to coat the starch granule with the stearate compound.

In order to prevent gelatinization of the starch during the mixing operation and to obtain the desired results, it is preferable to maintain the temperature of the slurry within the range of 100 to 140° F. the preferred range being 120 to 130° F. Some heating is required for coating of the starch granule by the stearate compound.

The pH of the slurry at this stage of the process will be about 7.5 to 8.5 but is not critical.

After the starch slurry containing the stearate is agitated and heated for the desired time there is added to it a water-soluble aluminum salt, such as aluminum chloride ($Al \cdot Cl_3 \cdot 6H_2O$), aluminum sulfate, aluminum acetate, etc. The amount of aluminum salt may vary from 0.01 to 0.06 part to one part of dry starch. Some excess aluminum salt over the molecular equivalent is required to precipitate the aluminum stearate on the starch but the amount should not exceed the upper limit of the range specified.

It is preferable to dissolve the aluminum salt, e. g., aluminum chloride hexahydrate, in water and add the solution to the starch slurry containing the stearate rather than add the salt directly. The starch slurry has a tendency to thicken when the aluminum salt solution is added and therefore the solution should be added slowly and with agitation. The total time for the reaction between the starch slurry containing stearate and the aluminum salt may vary considerably but generally 30 to 60 minutes is satisfactory at the temperature aforementioned, namely 100 to 140° F. but here again the preferred range is 120 to 130° F.

At this stage of processing the pH of the slurry will be about 3.0 to 4.0, if aluminum chloride hexahydrate has been used or higher if aluminum acetate is used, for example. The pH at this stage is not critical. However, the pH of the slurry prior to filtration is critical and should be adjusted to $5.0 \pm 0.2$, regardless of what the value was before. The adjustment may be made with any of the usual alkaline compounds used for this purpose, e. g., sodium carbonate, sodium, potassium and ammonium hydroxides, organic amines. At pH below or above that specified, i. e., pH $5 \pm 0.2$ both the mobility and hydrophobicity of the product are impaired, the exact reason for this not being known.

After the adjustment of the pH to $5.0 \pm 0.2$ the treated starch slurry is filtered, the product washed, if desired, dried and powdered.

Starch treated in accordance with my invention is extremely hydrophobic and is difficult to wet under normal conditions. It is necessary to add a small amount of a water-miscible solvent or wetting agent before the starch can be wetted. The mobile, hydrophobic starch when added to water will float on the surface indefinitely without wetting. The dry starch itself is also extremely mobile, resembling the flowability of water and can be sprayed readily through a nozzle. The treated starch can be pasted or cooked if previously wetted with a water-miscible solvent. The treated starch possesses a negative charge.

My mobile, hydrophobic starch is particularly useful in offset printing, cosmetic powders, as a releasing agent for dusting core boxes, for dusting container walls to prevent sticking of viscous materials, as detackifying agents for rubber dipped goods and the like.

The following example which is typical and informative only will further illustrate my invention.

*Example*

Washed corn (maize) starch was diluted to 19° Bé at 60° F. and heated to 120° F. To the slurry was added sufficient aqueous solution containing one part of technical grade of sodium stearate to 30 parts of water to provide 1.3 percent sodium stearate, based on dry substance starch. The stearate solution was made by heating the water to 145° F. and then adding the sodium stearate and agitating the mixture. A small amount (0.02—.03 percent) based on total weight of solution of a defoaming agent sold under the trademark "Antifoam AF" by Dow Chemical Company was added to control the foam.

The solution was cooled to 130° to 140° F. before addition to the slurry. (The aforementioned defoaming agent consists of water, glycerol monostearate, polyethylene oxide monostearate and a colorless, translucent silicone compound.)

After the solution of sodium stearate was added to the slurry, it was agitated by recirculating it through a pump for 1 hour while maintaining the temperature at 120° F. (The pH of the slurry was 7.5.) Thereafter there was added to the slurry sufficient aqueous solution containing one part of technical grade of aluminum chloride hexahydrate to 4 parts of water to provide 2.3 percent of aluminum chloride hexahydrate, based on dry substance starch. The agitation was continued for another hour while the temperature was maintained at 120° F. The pH of the slurry was 3.2.

The pH of the slurry was adjusted to 5.0 by the addition of a solution (15.5° Bé) of sodium carbonate. The slurry was agitated another 15 minutes and filtered on a vacuum filter. The cake was dried to a moisture content of 10–12 percent. The dried starch was then powdered and reeled through 12xx silk.

I claim:

1. A process of making mobile, hydrophobic starch which comprises heating with agitation an aqueous slurry of starch containing 0.005 to 0.04 part of water soluble soap per one part of dry starch at 100° F. to 140° F., adding 0.01 to 0.06 part of a water soluble aluminum salt per one part of dry starch, continuing the heating until aluminum soap is precipitated on the starch, adjusting the pH of the slurry to 5±0.2 and recovering the starch.

2. Process according to claim 1 wherein each heating period is 30 to 60 minutes.

3. Process according to claim 1 wherein the soap is a stearate.

4. Process according to claim 1 wherein the soap is a palmitate.

5. Process according to claim 1 wherein the soap is an oleate.

6. The process of claim 1 wherein the starch is recovered by filtration.

References Cited in the file of this patent

UNITED STATES PATENTS 2,355,463    Nivling _____ Aug. 8, 1944